US007665595B2

(12) United States Patent
Matheisl et al.

(10) Patent No.: US 7,665,595 B2
(45) Date of Patent: Feb. 23, 2010

(54) DRIVE SYSTEM WITH STEP CHAIN OR PALLET CHAIN FOR A TRANSPORTATION DEVICE AND TRANSPORTATION DEVICE WITH A CORRESPONDING DRIVE SYSTEM

(75) Inventors: Michael Matheisl, Vosendorf (AT); Thomas Novacek, Schwechat (AT)

(73) Assignee: Inventio AG, Hergiswil (CH)

( * ) Notice: Subject to any disclaimer, the term of this patent is extended or adjusted under 35 U.S.C. 154(b) by 113 days.

(21) Appl. No.: 11/959,625

(22) Filed: Dec. 19, 2007

(65) Prior Publication Data

US 2008/0149456 A1 Jun. 26, 2008

(30) Foreign Application Priority Data

Dec. 21, 2006 (EP) .................................. 06126810

(51) Int. Cl.
*B65G 21/20* (2006.01)
*B66B 21/02* (2006.01)
*B66B 23/14* (2006.01)

(52) U.S. Cl. ........................ 198/330; 198/838; 198/841

(58) Field of Classification Search ................. 198/330, 198/326, 327, 838, 841, 850, 851
See application file for complete search history.

(56) References Cited

U.S. PATENT DOCUMENTS

| | | | | |
|---|---|---|---|---|
| 3,052,133 | A * | 9/1962 | Bradley | 198/327 |
| 3,155,227 | A * | 11/1964 | Wesson | 198/834 |
| 4,082,173 | A * | 4/1978 | Simon-Kochloffel | 198/330 |
| 4,917,233 | A * | 4/1990 | Tsuda et al. | 198/833 |
| 5,957,268 | A * | 9/1999 | Meulenkamp | 198/850 |
| 6,834,754 | B2 * | 12/2004 | Pietz | 198/330 |
| 6,988,608 | B2 | 1/2006 | Pietz | |
| 7,159,705 | B2 * | 1/2007 | Ogimura et al. | 198/326 |

FOREIGN PATENT DOCUMENTS

| | | | |
|---|---|---|---|
| DE | 25 16 151 | A1 | 10/1976 |
| DE | 298 17 293 | U1 | 11/1998 |
| JP | 62105807 | A * | 5/1987 |
| WO | WO 96/33931 | A1 | 10/1996 |
| WO | WO 02/49951 | A1 | 6/2002 |

* cited by examiner

*Primary Examiner*—Mark A Deuble
(74) *Attorney, Agent, or Firm*—Ladas & Parry LLP

(57) ABSTRACT

A transportation system for a transportation device has a transportation chain having a plurality of chain links joined to form an articulated endless chain and with a sprocket to reverse the chain. The transportation chain has several equally-spaced guide elements which, in a transportation area of the transportation device are guided along a guide rail. The guide elements are formed of sliding elements that are mechanically linked to the transportation chain and slide along the guide rail when the transportation system is in motion. An outer circumference of the sprocket has recesses which at least partly accommodate the sliding elements.

11 Claims, 3 Drawing Sheets

DRIVE SYSTEM WITH STEP CHAIN OR PALLET CHAIN FOR A TRANSPORTATION DEVICE AND TRANSPORTATION DEVICE WITH A CORRESPONDING DRIVE SYSTEM

The present invention relates to a drive system with a step chain or pallet chain for a transportation device and a correspondingly equipped transportation device.

BACKGROUND OF THE INVENTION

Transportation devices in the sense of the invention are escalators and moving walks with a plurality of tread units, escalator steps or moving-walk pallets, which are joined to form an endless transporter. Users of the transportation devices stand on tread surfaces of the tread units, or stand or walk on the moving walk-pallets in the same direction of travel as the transportation devices themselves.

On escalators, the escalator steps form tread units, hereinafter referred to as "steps", and on moving walks the moving-walk pallets form step units, hereinafter referred to as "pallets". Escalators have a relatively large angle of inclination to overcome relatively large height differences such as appear between full building stories or greater. Moving walks run horizontally, or at a slight inclination, but generally with a smaller angle of inclination than escalators.

Such transportation devices typically contain step chains or pallet chains, by means of which the steps or pallets are moved in the direction of transportation. Hereinafter, reference will only be made to step chains, but this should be understood to refer also to pallet chains. These step chains are driven, and are provided with so-called rollers at equal intervals. The rollers roll or travel along tracks. In the area of the ends of the transportation devices, the step chains with the rollers pass around sprockets, or reversers, and thereby execute a change in direction of 180 degrees.

A transportation device with step chains or pallet chains is known from patent application DE-100 63 844. In that patent application, the primary objective is to reduce the number of chain elements, or chain links, that are used per step or pallet.

It is regarded as a disadvantage of transportation devices hitherto that the step chains, along with numerous rollers, are composed of many individual parts that are expensive as well as cost- and work-intensive. On the other hand, the step chain, along with the elements mounted on it, is one of the most important components of the transportation system of a transportation device, and certain changes to this complex drive system or transportation system can have undesired consequences, such as reduced ride comfort and possibly also uneven running or increased noise production.

Objects of the present invention are thus to create a drive system of the type stated in which such disadvantages stated are avoided, and which nevertheless enables smooth, jerk-free running, is not prone to faults, and has a long service life; and to create a transportation device that is equipped with such a transportation or drive system.

BRIEF DESCRIPTION OF THE INVENTION

According to the invention, the foregoing are objects fulfilled through a transportation system, and device having a transportation chain with a plurality of links joined into an articulated endless chain. A sprocket reverses the direction of travel of the chain. The chain has equally-spaced guiding elements which, in a transportation area of the chain, are guided along a guide rail. The guide elements contain sliding elements mechanically linked to the chain such that they slide along the guide rail when the transportation system is in motion. The sprocket has recesses to at least partially accommodate the sliding elements.

BRIEF DESCRIPTION OF THE DRAWINGS

The invention is described in detail below in relation to preferred illustrative examples and by reference to the accompanying drawings, wherein.

DETAILED DESCRIPTION OF THE INVENTION

Figure 1:
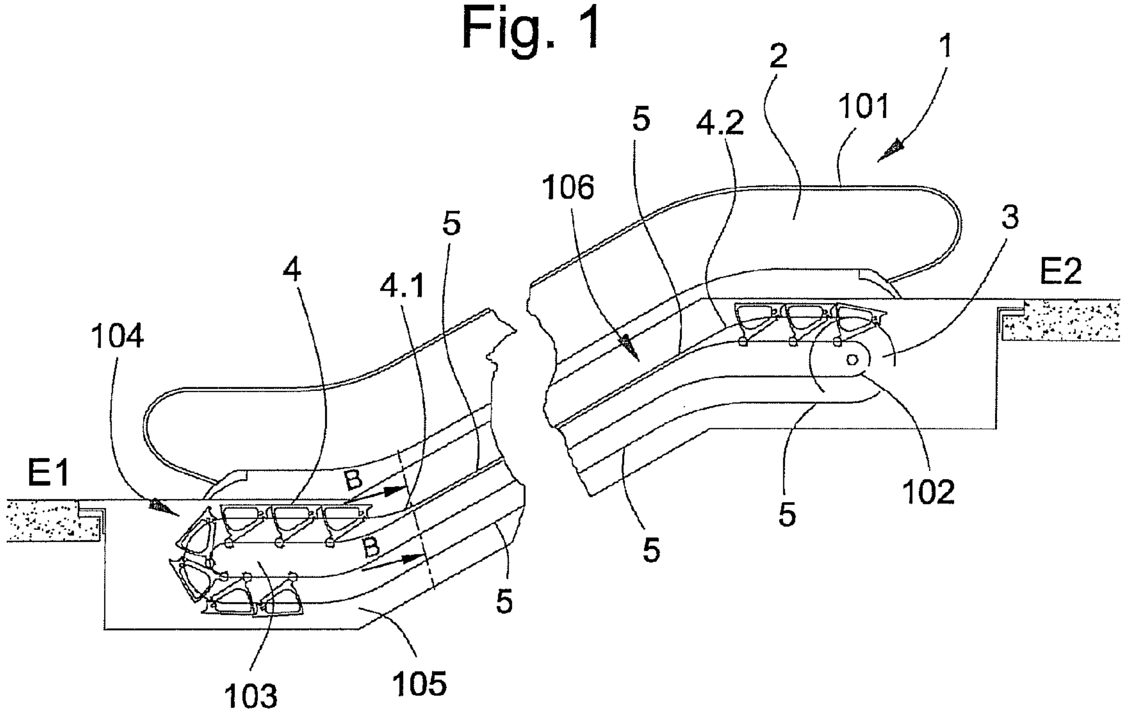
FIG. 1 is a diagrammatic side view, particularly cut away, of a transportation device in the form of an escalator.

The transportation device shown in FIG. 1 is an escalator 1 that connects a lower level E1 with an upper level E2. The transportation device 1 has side balustrades 2, and as visible moving parts, the step chain 5 and an endless handrail 101. The step chain (or pallet chain) 5, hereinafter referred to as the chain 5 and the handrail 101 can be moved as one, or simultaneously.

The escalator, or other endless transporter, essentially comprises a plurality of steps or tread elements 4 with the step chain or pallet chain 5 that connects the steps 4, a not-shown motor and gear, and an upper reverser 102 and a lower reverser 103 which are respectively located in the upper and lower end areas of the escalator. Only the axle of the upper reverser 102 is shown in the interest of clarity. The pallets or steps or tread units 4 are embodied and shown as steps, and have tread surfaces 104.

As indicated in FIG. 1, the transportation chain 5 runs from the lower reverser 103, which is in the area of the lower level E1, diagonally upward to the upper reverser 102 which is located in the area of the upper level E2. Hereinafter, the chain area that leads or travels from the lower reverser 103 to the upper reverser 102 is also referred to as the transportation area 106 of the transportation device 1, since in this area the tread surfaces 104 of the steps or tread units 4 face upward and can therefore accommodate persons. The return of the transportation chain 5 from the upper reverser 102 to the lower reverser 103 takes place in a return area 105 that lies below the said transportation area 106. During the return, in other words in the return area 105, the tread surfaces 104 of the tread units or steps 4 face down.

Chains of the same type as the chains 5, which are known from the prior art, comprise a plurality of chain links to which so-called rollers are fastened at equal intervals.

Figure 2:
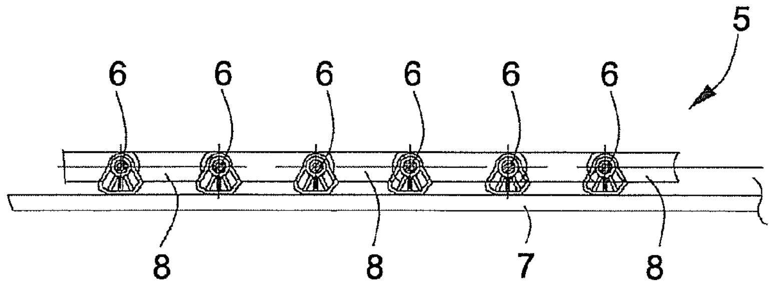
FIG. 2 is a side view of a section of a part of a transportation chain or transportation system.

According to a first embodiment of the invention that is shown in FIG. 2, a chain 5 is now used which, instead of the rollers, has so-called guide elements or sliding elements 6. These sliding elements 6 are mechanically connected to the chain 5 in such a manner that they slide, skid, or surf along a guide rail 7. The guide rails or rails 7, and the chain 5 with the sliding elements 6, are shown in horizontal orientation in FIG. 2. The chain 5 with the sliding elements 6 slides with the same inclination as the chain track 5 in FIG. 1 from the lower level E1 to the upper level E2. Provided in at least one of the areas of the reversers 102 and 103 is a sprocket 10 with a circumferential area 3 that has on its outer circumference recesses 3.1 to at least partly accommodate the sliding elements 6 of the chain 5. According to the first embodiment, the sprocket 10 is executed very similarly to the sprocket 10 that is described in association with a second embodiment and shown in FIG. 4A.

Figure 3:
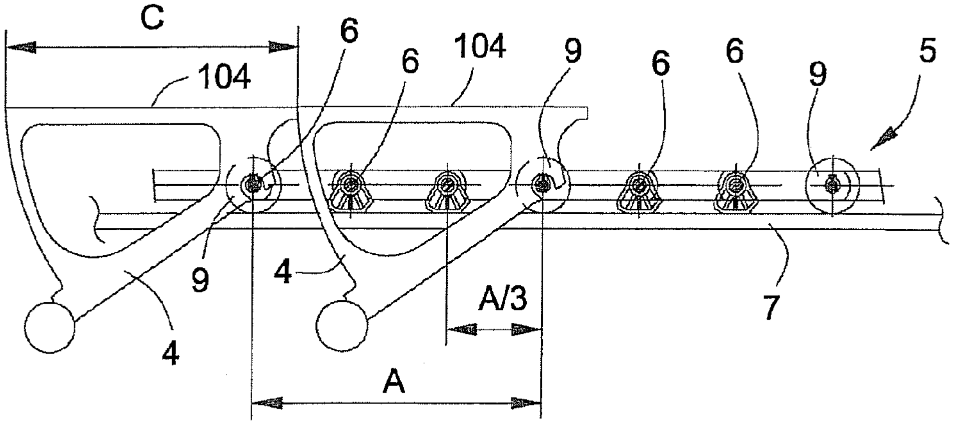
FIG. 3 is a side view of a section of a second embodiment of a transportation chain or system with steps shown moving horizontally.

The second embodiment of the invention is described below by reference to FIGS. 3, 4A, and 4B, identical references being used for identical, or identically functioning, elements in all embodiments. In FIG. 3, tread elements or steps 4 are shown with tread surfaces with a dimension or length C and spacing A in the direction of transportation. Also shown is a section of the transportation chain 5 which has several equally spaced guiding or sliding elements as well as rollers 9, which in the transportation zone of the transportation device 1 slide, or are slid, along the guide rail 7. As can be seen in FIG. 3, two elements 6 and 9 are different. On the one hand, the rollers 9 may be of known construction. Different from the prior art, the distance A between two adjacent rollers 9 is considerably greater than in conventional solutions. Arranged on the chain 5 between adjacent rollers 9 is at least one, but preferably two, elements that are embodied as sliding elements 6, arranged on the chain 5.

Figure 4A:
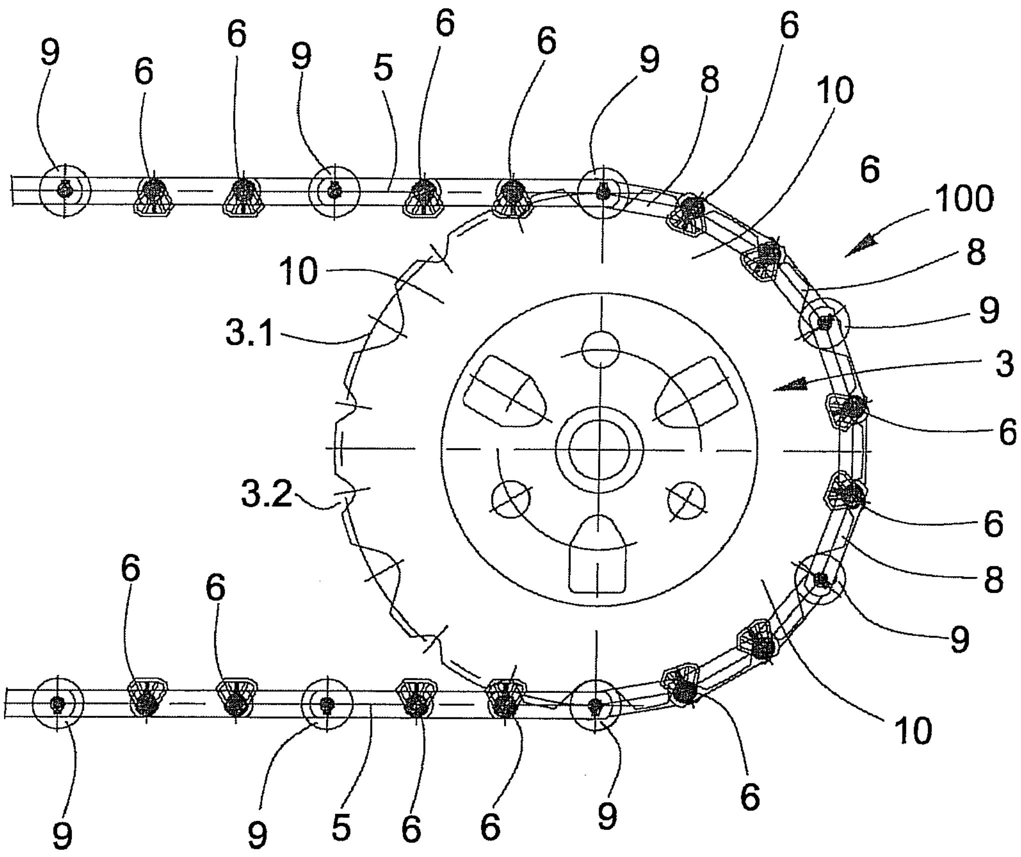
FIG. 4A is an enlarged side view of a drive wheel part of a transportation system; enlarged, near the drive wheel.
Figure 4B:
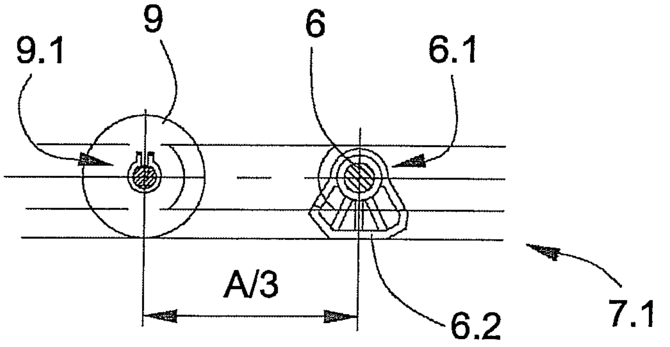
FIG. 4B is a further detail view of a part of the system according to FIG. 4A or FIG. 3.

As can be seen from FIG. 4B, the rollers 9 also have axles 9.1, and the sliding elements 6 other axles 6.1. These axles or chain pins 9.1 and 6.1 run essentially parallel to each other and extend perpendicular to the plane of the drawing. The rollers 9 and the sliding elements 6 are mechanically arranged on the transportation chain 5 in such a manner that sliding zones 6.2 of the sliding elements 6 lie in a tangential plane 7.1 to the rollers 9. The rollers 9 thus roll along the guide rail 7, while the sliding elements 6 with their sliding zones 6.2 skid or slide along the guide rail 7.

In FIG. 4A, further details of the transportation system or drive system 100 can be seen. The part of the transportation system 100 that is shown in FIG. 4A is also shown both in elevation and built into an escalator. In a moving walk or pallet transporter, the elements of the transportation system or drive system 100 that are shown run essentially approximately horizontal or at a slight inclination. The chain 5 that is shown comprises several chain elements or chain links 8. These chain links 8 are joined to each other in an articulated manner and form an endless chain. In the embodiment shown, each of the chain links 8 extends from axle or chain pin to axle or chain pin, i.e. between two axles or chain pins 9.1 and 6.1 of a roller 9 and of the adjacent sliding element 6, or between two axles or chain pins 6.1 of adjacent sliding elements 6. The distance between one of the axles or chain pins 9.1 to the nearest axle 6.1, or the distance between two successive axles or chain pins 6.1, determines the length of the chain links 8. Since, in the example shown, successive axles are equidistant with an axle interval of A/3, all chain links 8 are of equal length. This substantially simplifies the construction of the entire transportation chain 5, since only one or two types of chain link 8 are needed.

The distance A between the axles of two adjacent rollers 9 is preferably equal to the length C of the tread element or tread unit or step 4, i.e. A is approximately equal to C, as can be seen in FIG. 3. One roller 9 is provided per tread unit or step 4, and in the area of the chain pin or axle 9.1, the tread unit or step 4 is preferably connected to the roller 9 and thus also to the transportation chain 5, as shown in FIG. 3.

Also shown in FIG. 4A is how the transportation chain 5 is passed around the sprocket 10 to change the direction of the transportation chain 5. The recesses 3.1 that are provided on the outer circumference of the sprocket 10 are for the rollers 9, and the recesses 3.2 are for the sliding elements 6. Since, in the embodiment that is shown, there are always two sliding elements 6 provided on the sprocket between two rollers 9, between two recesses 3.1 for rollers 9 are two corresponding recesses 3.2 for the sliding elements 6. The number of recesses 3.2 between two recesses 3.1 is arbitrary.

The sprocket 10 may have recesses that are arranged at equal angular intervals and which are all executed identically, or of the same or similar size, to accommodate both the rollers 9 and the sliding elements 6.

Figure 5A:
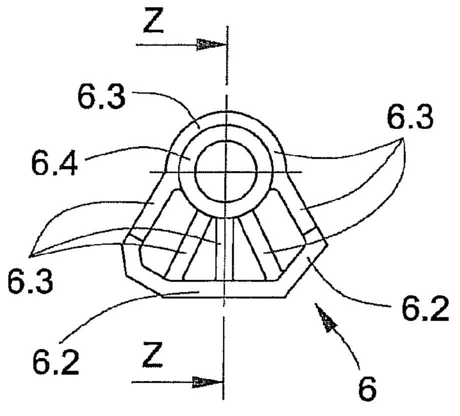
FIG. 5A is a side elevation view of a sliding element.
Figure 5B:
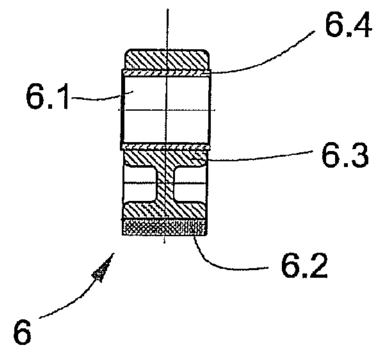
FIG. 5B is a cross-section view, along line z-z of the sliding element of FIG. 5A.

Shown in FIGS. 5A and 5B are further details of a possible embodiment of a sliding element 6. FIG. 5A shows an elevation or front view, and FIG. 5B a cross-section along the line Z-Z of FIG. 5A. The sliding element 6 that is shown has a sliding zone 6.2 that is designed for optimal sliding. As shown, the sliding zone 6.2 is designed skid-shaped with curved or angled frontal and rear portions, to allow problem-free insertion into and sliding, along the guide rail 7. In addition to the sliding zone 6.2, the sliding element 6 comprises a supporting body or base body 6.3, for example with struts or webs. In addition, an area can be provided to accommodate an inset or sliding bearing bushing 6.4.

It is preferable that the sliding zone 6.2 be coated with or consist of a material that has a low coefficient of friction. Especially suitable is a sliding zone 6.2 with a polytetrafluorethylene (PTFE) bandage or with a polyurethane bandage. Use can also be made of an aramid, thermoplastic elastomers (TPE), thermoplastic polyurethane (TPU), or of any other appropriate thermoplastic plastic. These bandages are preferably hydrolyte-resistant or hydrolyte-stabilized.

PTFE is particularly suitable on account of its suitable material combinations, low coefficient of friction, and robustness. Since PTFE slides particularly frictionlessly, on PTFE, in a preferred embodiment a guide rail 7 is used which, in the area of the sliding zone, is also provided with PTFE or coated with a TEFLON fluoropolymer. Furthermore, with suitable material combinations, the static friction of PTFE is exactly the same as its sliding friction, so that a transition from standstill to movement can take place without jerking, which for applications in the area of the transportation devices is particularly advantageous.

Figure 6A:
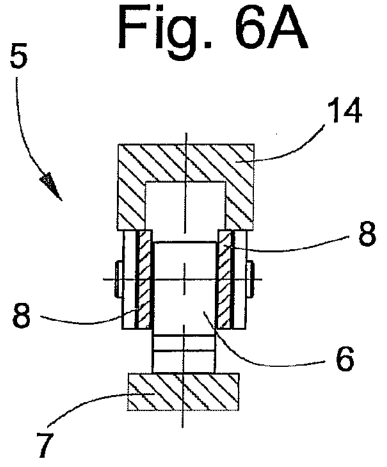
FIG. 6A is a cross-section view taken along line B-B of FIG. 1 of the sliding element of FIG. 5A in the area of a reversing radius, further depicting a first embodiment of a chain counter-pressure guide.
Figure 6B:
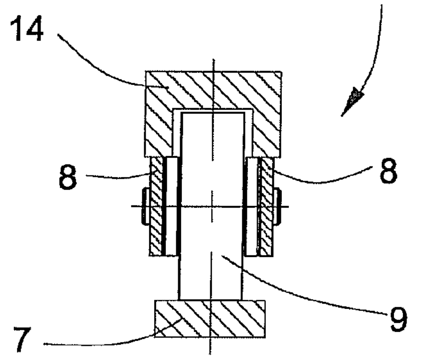
FIG. 6B is the same view as FIG. 6A, but showing a roller in the area of the reversing radius, here also depicting a first embodiment of a chain but showing a counter-pressure guide.

Shown in FIGS. 6A and 6B are further details of a possible embodiment or chain variant. This is also an embodiment in which rollers 9 and sliding elements 6 are used on one and the same chain 5. As indicated in FIG. 1, there are transitional areas where a transition arc 4.1 or 4.2 with a transition radius is present. This is particularly the case when in a travel direction a transition is provided between two differently inclined parts of the transportation area. Due to the pretension on the transport chain 5, in the area of the transition arc 4.1 the chain 5 runs like a chord of a circle whose radius is equal to the transition radius. To prevent lifting of the rollers 9 and/or of the sliding elements 6 in that area a chain counter-pressure guide 14 is provided. As can be seen in FIGS. 6A and 6B, the chain counter-pressure guide 14 has a cross-section in the form of a U or a C. The chain counter-pressure guide 14 is installed with respect to the guide rail 7 in such manner that it presses against two side plates of the chain links 8 so as to press the roller 9 or the sliding element 6 against the guide-rail 7. The chain counter-pressure guide 14 prevents the transmission chain 5 from running in the manner of the chord described above.

Figure 6C:
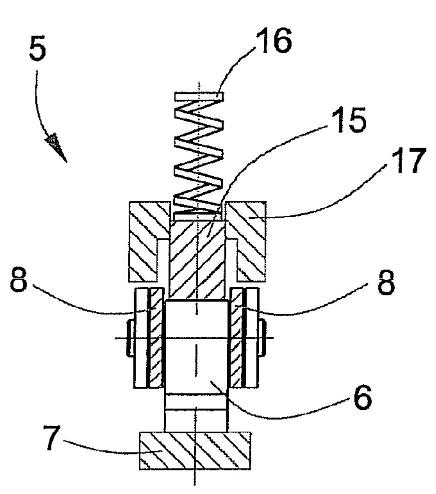
FIG. 6C is the same view as FIG. 6A, but showing a sliding element undergoing reversal and depicting a second embodiment of a chain counter-pressure guide.
Figure 6D:
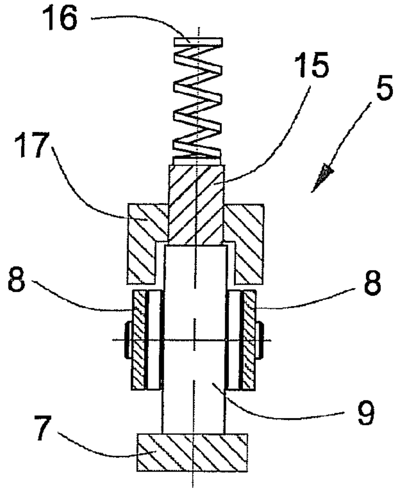
FIG. 6D is the same view as FIG. 6A, but showing a roller undergoing reversal and depicting a second embodiment of a chain counter-pressure guide.

Alternatively, or additionally, a further chain counter-pressure guide construction 15, 16, 17 can be used, as shown in FIGS. 6C and 6D. In this case, pressure guide elements 15 are used, on which a spring 16 acts, and which press against the rollers 9 or sliding elements 6. The spring 16 provides automatic adjustment of the position or height of the pressure guide elements. In FIG. 6C, the pressure guide element is shown moved further in the direction of the guide rail 7 than in FIG. 6D.

Instead of arranging three chain links 8 between two successive rollers, as described above, a smaller or larger number of chain divisions or chain links can be used. The longer the chain links, the more necessary may be the use of a suitable chain counter-pressure guide, as described, since chains with longer chain links are less articulated and flexible.

In a proven embodiment the sliding elements 6 are mechanically linked via corresponding bushings to the transportation chain 5 in such a manner that they permit certain articulations, chain oscillations, or swinging movements about the axle 6.1 and/or in the perpendicular direction.

The invention as described is equally applicable to escalators and moving walks, and allows a completely new generation of escalators and moving walks to be realized that partly, if not completely, dispenses with rollers. The new transportation device is more advantageous, beneficial, and inexpensive since, instead of three rollers 9 per step 4 or pallet as formerly, now only one roller, as in the embodiment according to FIG. 3, or absolutely no rollers, as in the embodiment according to FIG. 2, is/are used. This has the advantage of minimizing the use of expensive ball bearings that are required to join the rollers 9 to the transportation chain 5.

If several sliding elements 6 are used, a more even distribution of wear and load is obtained. Reduced wear is thereby assured or defined or determined.

We claim:

1. A transportation system for a transportation device, comprising a transportation chain with a plurality of chain links joined into an articulated endless chain and a sprocket to reverse a direction of the transportation chain, the transportation chain having a plurality of equally spaced guiding elements which, in a transportation area of the transportation device are guided along a guide rail, characterized in that a plurality of rollers are mechanically linked to the transportation chain and oriented in such a manner as to roll along the guide rail when the drive system of the transportation device is in motion, the sprocket having on its outer circumference recesses to at least partly accommodate the rollers, a guide element comprises at least one sliding element mechanically linked to the transportation chain and oriented in such a manner as to slide along the guide rail when the transportation system of the transportation device is in motion, and the sprocket has on an outer circumference recesses to at least partly accommodate the at least one sliding element.

2. A transportation system according to claim 1, characterized in that the transportation device has a plurality of steps or pallets and the plurality of rollers corresponds in number to the plurality of steps or pallets, the rollers being equally spaced along the transportation chain.

3. A transportation system according to claim 1 or 2, wherein at least one sliding element is arranged on the transportation chain between two adjacent rollers.

4. A transportation system according to claim 3, wherein two sliding elements are arranged between two rollers.

5. A transportation system according to claim 1, or 2, wherein the sliding elements are in the form of a skid.

6. A transportation system according to claim 1, or 2, wherein the one sliding elements have a sliding zone with a low coefficient of friction.

7. A transportation system according to claim 1, or 2, wherein the transportation chain has a transitional arc area, and further comprising a chain counter-pressure guide adapted and oriented to exert a directed pressure on the transitional arc area of the transportation chain.

8. A transportation device, having a transportation system according to claim 1, or 2 and further comprising at least one guide rail along which at least one of the sliding elements and a roller travel when the transportation system of the transportation device is in motion.

9. A transportation device according to claim 8, characterized in that provided in an area of the transportation chain is a chain counter-pressure guide to prevent local lifting of at least one of the sliding elements and a roller.

10. A transportation device according to claim 8, wherein the guide rail has a low friction sliding surface.

11. A transportation system for a transportation device, comprising a transportation chain with a plurality of chain links joined into an articulated endless chain and a sprocket to reverse a direction of the transportation chain, the transportation chain having a plurality of equally spaced guiding elements which, in a transportation area of the transportation device are guided along a guide rail, characterized in that a guide element comprises at least one sliding element mechanically linked to the transportation chain and oriented in such a manner as to slide along the guide rail when the transportation system of the transportation device is in motion, the sprocket has on an outer circumference recesses to at least partly accommodate the at least one sliding element, and the transportation chain has a transitional arc area, a chain counter-pressure guide being adapted and oriented to exert a directed pressure on the transitional arc area.

* * * * *